(12) United States Patent
Suzuki et al.

(10) Patent No.: US 7,876,557 B2
(45) Date of Patent: Jan. 25, 2011

(54) DISK ARRAY DEVICE

(75) Inventors: Katsuyoshi Suzuki, Odawara (JP);
Masahiko Sato, Odawara (JP); Kenichi Tateyama, Odawara (JP); Naoto Matsunami, Hayama (JP); Koichi Kimura, Kamakura (JP); Hidehiko Iwasaki, Hiratsuka (JP); Kenichi Takamoto, Odawara (JP); Kenji Muraoka, Odawara (JP); Takamasa Ishikawa, Minamiashigara (JP); Nobuhiro Yokoyama, Odawara (JP); Kiyotaka Takahashi, Odawara (JP); Yoshinori Nagaiwa, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/481,142

(22) Filed: Jun. 9, 2009

(65) Prior Publication Data

US 2009/0237876 A1 Sep. 24, 2009

Related U.S. Application Data

(63) Continuation of application No. 12/034,995, filed on Feb. 21, 2008, now Pat. No. 7,558,056, which is a continuation of application No. 11/483,003, filed on Jul. 6, 2006, now Pat. No. 7,352,571, which is a continuation of application No. 11/184,307, filed on Jul. 18, 2005, now Pat. No. 7,120,016, which is a continuation of application No. 10/461,644, filed on Jun. 13, 2003, now Pat. No. 6,950,304.

(30) Foreign Application Priority Data

Jun. 14, 2002 (JP) .............................. 2002-174947

(51) Int. Cl.
*H05K 7/20* (2006.01)
*G06F 1/20* (2006.01)

(52) U.S. Cl. .............................. 361/679.49; 361/679.5; 361/679.48; 361/679.46; 361/695

(58) Field of Classification Search ............ 361/679.46, 361/679.48, 679.49, 679.5, 679, 683–686, 361/695
See application file for complete search history.

(56) References Cited

U.S. PATENT DOCUMENTS 4,899,254 A * 2/1990 Ferchau et al. .............. 361/695

(Continued)

FOREIGN PATENT DOCUMENTS

JP 09-305263 A 11/1997

(Continued)

OTHER PUBLICATIONS

European Patent Office (EPO) Examination Report for EPO patent application EP03013042.1 (Mar. 11, 2010).

(Continued)

*Primary Examiner*—Anatoly Vortman
(74) *Attorney, Agent, or Firm*—Townsend and Townsend and Crew LLP

(57) ABSTRACT

A disk array device comprises: a hard disk drive module including a disk for recording information thereon and having one side that has a length substantially equal to the diameter of the disk; a battery nodule; an operation module; a fan module having at least one cooling fan; a controller module having a controller; a power supply module provided for supplying power to the modules; a circuit board to which the above-mentioned modules are connected via electrical connectors; and a substantially box-shaped chassis in which the modules and the circuit board are housed. A front surface and a rear surface of the chassis are opened in a rectangular shape. A length of one side of the opened front surface of the chassis is substantially the same length as the one side of the hard disk drive module.

17 Claims, 13 Drawing Sheets

U.S. PATENT DOCUMENTS

| | | | |
|---|---|---|---|
| 5,247,427 A | 9/1993 | Driscoll et al. | |
| 5,333,097 A | 7/1994 | Christensen et al. | |
| 5,414,591 A | 5/1995 | Kimura et al. | |
| 5,506,750 A | 4/1996 | Carteau et al. | |
| 5,619,486 A * | 4/1997 | Uno et al. | 720/654 |
| 5,684,671 A | 11/1997 | Hobbs et al. | |
| 5,816,673 A | 10/1998 | Sauer et al. | |
| 5,822,184 A | 10/1998 | Rabinovitz | |
| 5,971,804 A | 10/1999 | Gallagher et al. | |
| 6,018,456 A | 1/2000 | Young et al. | |
| 6,052,278 A | 4/2000 | Tanzer et al. | |
| 6,144,553 A | 11/2000 | Hileman et al. | |
| 6,496,366 B1 | 12/2002 | Coglitore et al. | |
| 6,525,935 B2 * | 2/2003 | Casebolt | 361/679.46 |
| 6,563,706 B1 * | 5/2003 | Strickler | 361/695 |
| 6,606,253 B2 | 8/2003 | Jackson et al. | |
| 6,684,282 B1 | 1/2004 | Kocis | |
| 6,693,796 B2 | 2/2004 | Ives et al. | |
| 6,778,386 B2 | 8/2004 | Garnett et al. | |
| 6,819,560 B2 * | 11/2004 | Konshak et al. | 361/679.5 |
| 6,867,967 B2 * | 3/2005 | Mok | 361/679.49 |
| 6,957,291 B2 | 10/2005 | Moon et al. | |
| 7,061,715 B2 | 6/2006 | Miyamoto et al. | |
| 7,139,170 B2 | 11/2006 | Chikusa et al. | |
| 7,508,663 B2 * | 3/2009 | Coglitore | 361/695 |
| 2001/0046118 A1 | 11/2001 | Yamanashi et al. | |
| 2002/0062454 A1 | 5/2002 | Fung | |
| 2002/0126449 A1 | 9/2002 | Casebolt | |
| 2003/0033463 A1 | 2/2003 | Garnett et al. | |
| 2003/0048607 A1 * | 3/2003 | Ives et al. | 361/695 |
| 2003/0200473 A1 | 10/2003 | Fung | |

FOREIGN PATENT DOCUMENTS

| | | |
|---|---|---|
| JP | 10-200280 A | 7/1998 |
| JP | 11-184570 A | 7/1999 |
| JP | 11-232854 A | 8/1999 |
| JP | 11-329639 A | 11/1999 |
| JP | 2001-202767 A | 7/2001 |
| JP | 2001-338486 A | 12/2001 |
| JP | 2006-221215 A | 8/2006 |
| WO | 00/14746 A | 3/2000 |
| WO | WO00/52695 A1 | 9/2000 |

OTHER PUBLICATIONS

European Patent Office (EPO) Examination Report for EPO patent application EP03013042.1 (Aug. 28, 2009).

* cited by examiner

DISK ARRAY DEVICE

CROSS-REFERENCE TO RELATED APPLICATIONS

The present application claims priority upon Japanese Patent Application No. 2002-174947 filed Jun. 14, 2002, which is herein incorporated by reference.

BACKGROUND OF THE INVENTION

1. Field of the Invention

The present invention relates to a disk array device.

2. Description of the Related Art

A disk array device for use as an external storage device in a computer system generally comprises hard disk drives, a controller, a power supply, a battery, an enclosure, and a fan. These components are placed within a single housing. In the event of a power failure, the battery supplies power so that cached data is written on a hard disk drive to automatically initiate and complete a planned shutdown for the purpose of avoiding the loss of cached customer data. When a disk array unit is added, the enclosure controls relaying and/or connection in relation to the added unit. In order to prevent the housing internal temperature from rising, the fan takes in air from the outside of the housing to forcibly replace internal air with external air.

It is highly requested that such a disk array device be downsized. However, the size of the disk array device generally increases with an increase in its storage capacity. This is because, since the use of a larger number of hard disk drives and a higher-performance controller is required to provide a large storage capacity, a large-size power supply and a cooling device have to be provided. To provide adequate cooling performance, it is also necessary to consider the device's internal ventilation. When a plurality of disk array devices of a greater size is added for use, the required installation area increases accordingly.

Under these circumstances, various techniques have been proposed with a view toward decreasing the size without sacrificing the cooling performance. For example, the technique disclosed by Japanese Patent Application Laid-open Publication No. JP-2001-338486-A separates a cooling air flow path into two. One path is used for the flow of cooling air provided by a fan that is attached to a power supply mule, which is mounted in the upper part of a disk array device. The other path is used for the flow of cooling air provided by a cooling fan module, which is mounted on a lateral surface of the lower part of the disk array device. Further, a heating element and a power supply module with a cooling fan are positioned after the air flow paths. This decreases the front-to-rear dimension of the disk array device without sacrificing the cooling performance.

However, the technique disclosed by Japanese Patent Application Laid-open Publication No. JP-2001-338486-A cannot reduce the height of the disk array device when the cooling air flow path is separated into the path for the cooling air provided by the power supply module in the upper part of the device and the path for the cooling air provided by the cooling fan module in the lower part of the device. Further, if the fan module in the lower part of the device becomes faulty, the device's lower part cooling efficiency decreases. Furthermore, a cooling fan is provided in both the upper and lower parts of the device. As a result, a large number of cooling fans are used for the whole disk array device.

SUMMARY OF THE INVENTION

The present invention provides a disk array device comprising: a circuit board having electrical connectors; a hard disk drive module connected to the circuit board via at least one of the electrical connectors, including a disk for recording information thereon, and having one side that has a length substantially equal to the diameter of the disk; a battery module connected to the circuit board via at least one of the electrical connectors; an operation module connected to the circuit board via at least one of the electrical connectors; a fan module connected to the circuit board via at least one of the electrical connectors and having at least one cooling fan; a controller module connected to the circuit board via at least one of the electrical connectors and having a controller; a power supply module connected to the circuit board via at least one of the electrical connectors and provided for supplying power to the modules; and a substantially box-shaped chassis in which said modules and said circuit board are housed, a front surface and a rear surface of which being opened in a rectangular shape; wherein a length of one side of the opened front surface of the chassis is substantially the same length as the one side of the hard disk drive module.

Objects of the present invention and solutions provided by the present invention will be apparent from the following description of the embodiments of the invention and the accompanying drawings.

According to the present invention, it is possible to provide a disk array device that has substantially the sane height as a hard disk drive module. Further, it is also possible to cool the interior of the chassis with high efficiency.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
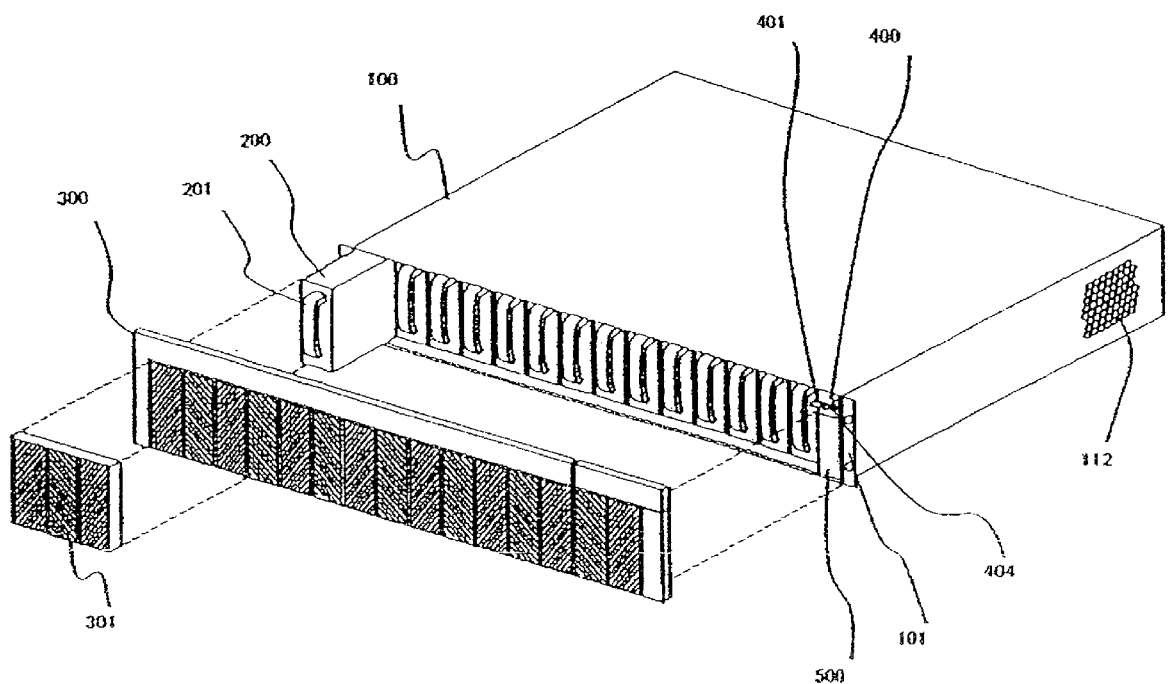
FIG. 1 is an external perspective view of a disk array device according to one embodiment taken from the front right-hand side.

Embodiments of the present invention will now be described in detail with reference to the accompanying drawings.

A disk array device according to one embodiment of one aspect of the present invention comprises: a circuit board having electrical connectors; a hard disk drive module connected to the circuit board via at least one of the electrical connectors, including a disk for recording information thereon, and having one side that has a length substantially equal to the diameter of the disk; a battery module connected to the circuit board via at least one of the electrical connectors; an operation module connected to the circuit board via at least one of the electrical connectors; a fan module connected to the circuit board via at least one of the electrical connectors and having at least one cooling fan; a controller module connected to the circuit board via at least one of the electrical connectors and having a controller; a power supply module connected to the circuit board via at least one of the electrical connectors and provided for supplying power to the nodules; and a substantially box-shaped chassis in which said modules and said circuit board are housed, a front surface and a rear surface of which being opened in a rectangular shape. A length of one side of the opened front surface of the chassis is substantially the same length as the one side of the hard disk drive module.

According to such a configuration, it is possible to reduce the disk array device size. Since the installation area occupied by the disk array device can be decreased by downsizing of the disk array device, it becomes possible to reduce the computer system running cost.

In another aspect of the disk array device according to the present embodiment, it is possible that: the circuit board is capable of being attached in the chassis parallel to the opened front surface; the hard disk drive module is connected to a front side of the circuit board from the opened front surface of the chassis, the one side of the hard disk drive module being aligned with the one side of the opened front surface of the chassis; the battery module is connected to the front side of the circuit board from the opened front surface of the chassis in a position adjacent the hard disk drive module; and the controller module, the power supply module, and the fan module are connected to a rear side of the circuit board from the opened rear surface of the chassis.

According to such a configuration, the hard disk drive module and the battery module can be inserted/removed into/from the front of the disk array device for module insertion/removal purposes. Therefore, maintenance and inspection of the disk array device can be made with ease. Further, by arranging the power supply module, the controller module, and the fan module at the rear of the disk array device, it becomes possible to prevent changes to the device, such as cabling changes and setting changes, from being made easily. These features increase the disk array device's serviceability, maintainability, and security.

In another aspect of the disk array device according to the present embodiment, it is possible that: the circuit board has a front circuit board to which at least the hard disk drive nodule and the battery module are connected to the front side thereof, and to which the power supply module and the fan module are connected to the rear side thereof, and a rear circuit board to which the controller module is connected; and the front circuit board and the rear circuit board are positioned adjacent and parallel to each other and connected together with an electrical connector.

According to such a configuration, the circuit board size can be reduced. As a result, the circuit board can be mounted within a chassis for a small-size disk array device.

In another aspect of the disk array device according to the present embodiment, it is possible that: the controller module has a management portion for managing additional installation of a disk array device.

Conventionally, additional disk array device installation was managed by an independent module called an "enclosure". Hover, according to the configuration mentioned above, it is possible to decrease the number of modules and reduce the disk array device size. The management portion for managing additional installation of a disk array device is used to provide integrated access control for each of the hard disk drive modules mounted in a plurality of disk array devices, in case a disk array device is additionally installed. As described later, the management portion for managing additional installation may be realized by, for example, a memory or the like in the controller module that stores an appropriate program, and a CPU in the controller module that can execute the program.

In another aspect of the disk array device according to the present embodiment, it is possible that: the controller module is substantially flat; a plurality of the controller modules are capable of being be arranged on the circuit board adjacent to each other in a direction of the height of the chassis to maximize the area in which the controller modules oppose each other; and the connectors for connecting each of the controller modules to the circuit board are arranged on the circuit board in the direction of the height of the chassis.

According to such a configuration, the length of the wiring on the circuit board for connecting the controller modules can be minimized. This decreases the wiring space, thereby reducing the size of the circuit board. Further, since crosstalk between wires can be avoided, it becomes possible for the controller modules to share a cache, thereby enhancing the disk access performance.

In another aspect of the disk array device according to the present embodiment, it is possible that: the chassis has at least one hole and/or at least one protrusion; and the circuit board has at least one protrusion that fits into the hole of the chassis and/or at least one hole into which the protrusion of the chassis fits.

According to such a configuration, the circuit board can be directly attached to the chassis with high accuracy. This also makes it possible to reduce the number of parts for mounting the circuit board on the chassis, thereby reducing the size of the chassis.

In another aspect of the disk array device according to the present embodiment, it is possible that: at least two of the fan modules are provided; and at least one of the fan modules is arranged near each side surface of the chassis.

According to such a configuration, the interior of the chassis can be cooled without having to furnish the pr supply module with a fan. This results in downsizing of the disk array device.

Further, it is possible that: cooling air flow provided by the fan modules is introduced from the front of the chassis to cool at least the hard disk drive module and the battery module, cools, in the rear of the circuit board, the power supply module and the controller module, is taken in by the fan modules provided near both of the side surfaces of the chassis, and is discharged out of the rear of the chassis.

According to such a configuration, heated air in the chassis is discharged from the fan module on each side of the chassis. Therefore, the interior of the chassis can be efficiently cooled.

Further, it is possible that: each of the fan modules has a plurality of cooling fans; and air outlets of each of the cooling fans are oriented in directions different from each other to avoid interference between cooling air flow.

According to such a configuration, the cooling fans can discharge air with high efficiency. As a result, warmed air within the chassis can be efficiently discharged.

In another aspect of the disk array device according to the present embodiment, it is possible that: the fan module is arranged near at least one side surface of the chassis; a partitioning plate is provided substantially in the middle of both side surfaces of the chassis; a set of the power supply modules is provided, and at least one of the power supply modules is arranged on each side of the partitioning plate; the controller module is arranged across the partitioning plate; and the partitioning plate is provided with a vent hole.

When the partitioning plate having such a configuration is used, it becomes possible to circulate cooling air within the chassis with only one fan module. Therefore, even if one of the fan modules becomes faulty, the whole chassis can be continuously cooled. As a result, the availability of the disk array device can be enhanced.

In another aspect of the disk array device according to the present embodiment, it is possible that: the controller module is substantially flat; and the circuit board has a plurality of holes extending in a direction parallel to the controller module.

According to such a configuration, the cooling air flow within the chassis is rectified when it passes through the circuit board. As a result, the cooling air flow within the chassis is properly adjusted to efficiently cool the interior of the chassis.

In another aspect of the disk array device according to the present embodiment, it is possible that the length of the one side of the opened front surface of the chassis is between 128 mm and 129 mm when the diameter of the disk is 3.5 inches.

According to such a configuration, the height of the disk array device can be set to no more than 3 U (approximately 133.35 mm), which is defined by the EIA Standard EIA-310-D.

In another aspect of the disk array device according to the present embodiment, it is possible that: the operation module includes an alarm buzzer stop switch, and a power switch for the disk array device, the power switch having an ON-side for turning the disk array device ON and an OFF-side for turning the disk array device OFF; and the alarm buzzer stop switch is arranged on the side of the ON-side of the power switch.

According to such a configuration, it becomes possible to prevent the disk array device from being turned OFF even if the power switch is inadvertently touched when the alarm buzzer stop switch is pressed to stop an alarm buzzer that sounds in the event of an error.

Further, it is possible that: a setting switch is provided inside the operation module; and the setting switch is capable of being manipulated for setup from a space in front of a hard disk drive module adjacent the operation module.

This minimizes the volume occupied by the operation module for disk array device setup.

FIG. 1 is an external perspective view of the disk array device taken from the front right-hand side.

A front decorative door 300 is mounted on a chassis 100 in such a manner that the front decorative door 300 is removable.

Further, louvers 301 are mounted on the front decorative door 300 in such a manner that three louvers 301 form a unit and the louvers 301 are removable on a unit-by-unit basis. The louvers 300 are available in various colors according to design and can be replaced as needed. The front decorative door 300 also provides adequate ventilation. As described later, modules of fans 800 (hereinafter referred to as the fan modules) take in outside air into the chassis 100 via the front decorative door 300 in order to cool the interior of the chassis 100 and discharges air out from the rear of the chassis 100. Vent holes 112 are used to discharge air out of the chassis 100 and provided on both sides of the chassis 100.

Figure 2:
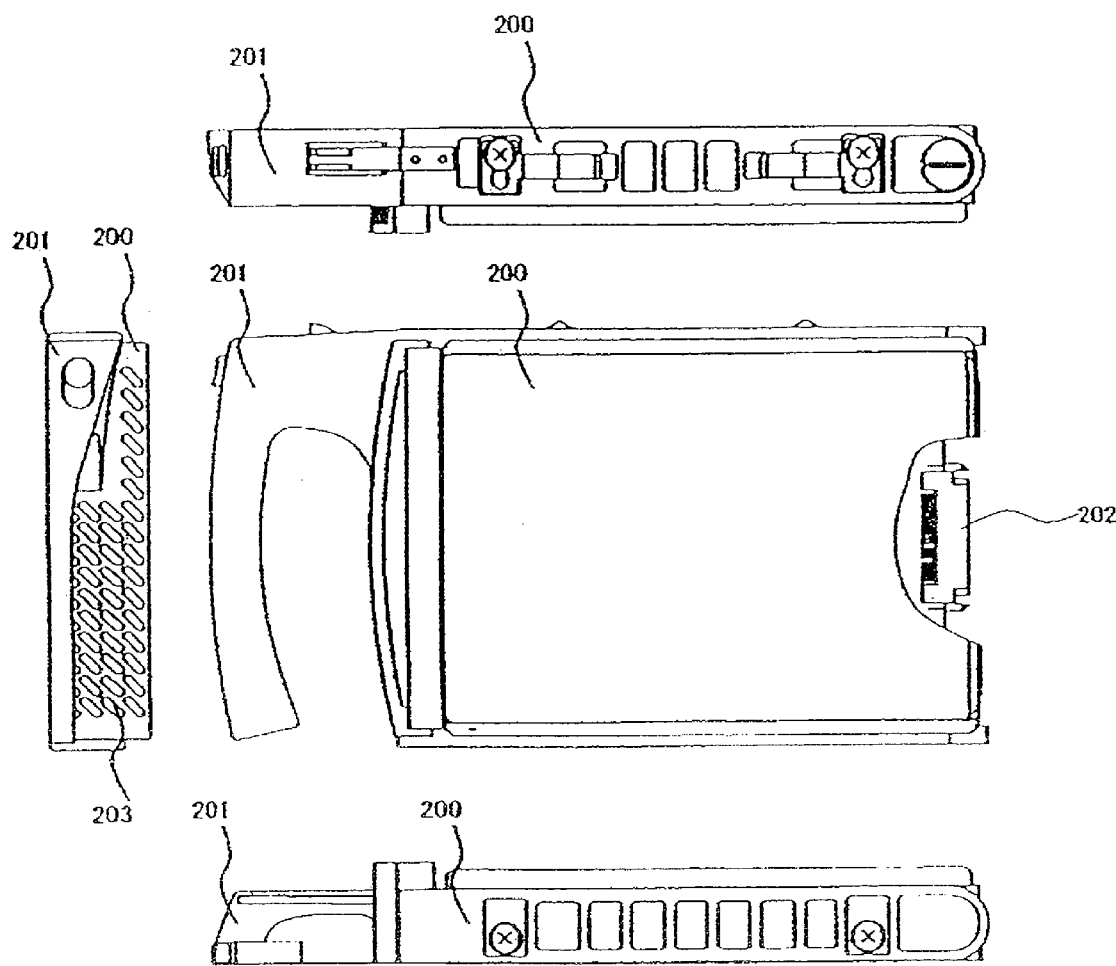
FIG. 2 is a projection of a hard disk drive module according to the embodiment.

There is an opening at the front of the chassis 100. A lug 101 is provided on the right-and left-hand sides of the opening. From the left-hand side, hard disk drive modules 200 (referred to herein as HDD modules 200 in the present embodiment) are sequentially positioned in the front opening of the chassis 100 in such a manner that the HDD modules 200 are removable. Each HDD module 200 can be removed with its handle 201. FIG. 2 is a projection of a HDD module. A plurality of vent holes 203 are provided in the front surface of a HDD module. An electrical connector 202 is mounted on the rear of a HDD module. Each HDD module 200 has inside a 3.5-inch (approximately 88.9 mm) disk as a recording medium and has a height of approximately 115.8 mm. Each HDD module is positioned within the chassis 100 in such a manner that the direction of the disk diameter is in the height direction of the HDD module. The front opening in the chassis 100 is large enough to house fourteen HDD modules 200 from the left-hand side.

Further, as shown in FIG. 1, the rightmost part of the front opening in the chassis 100 is used to house a module 500 of a battery (hereinafter referred to as the battery module 500) and a module 400 of an operation panel (hereinafter referred to as the operation module 400). The battery module 500 supplies power as needed to write cached data onto a hard disk drive and to automatically initiate and complete a planned shutdown in the event of a power failure for avoiding the loss of cached customer data. Since the power stored in the battery module 500 gradually decreases with time, the battery module 500 needs to be exchanged periodically. For this reason, the battery module 500 is mounted at the front of the chassis 100 so as to facilitate its replacement.

The disk array device can be mounted in a 19-inch rack-type housing compliant with the EIA Standard EIA-310-D. When considering both the height of the HDD modules 200 having a 3-5-inch diameter disk (the height of the HDD module is approximately 115.8 mm) and the 3 U height limit for the disk array device defined by the EIA Standard EIA-310-D, the height of the disk array device should be between 115.8 mm and 133.3 mm. Further, when the positional relationship between the HDD modules 200 and disk array device is considered to keep the HDD modules out of contact with the disk array device, it is preferable that the approximate height of the disk array device be between 128 mm and 129 mm.

Figure 3:
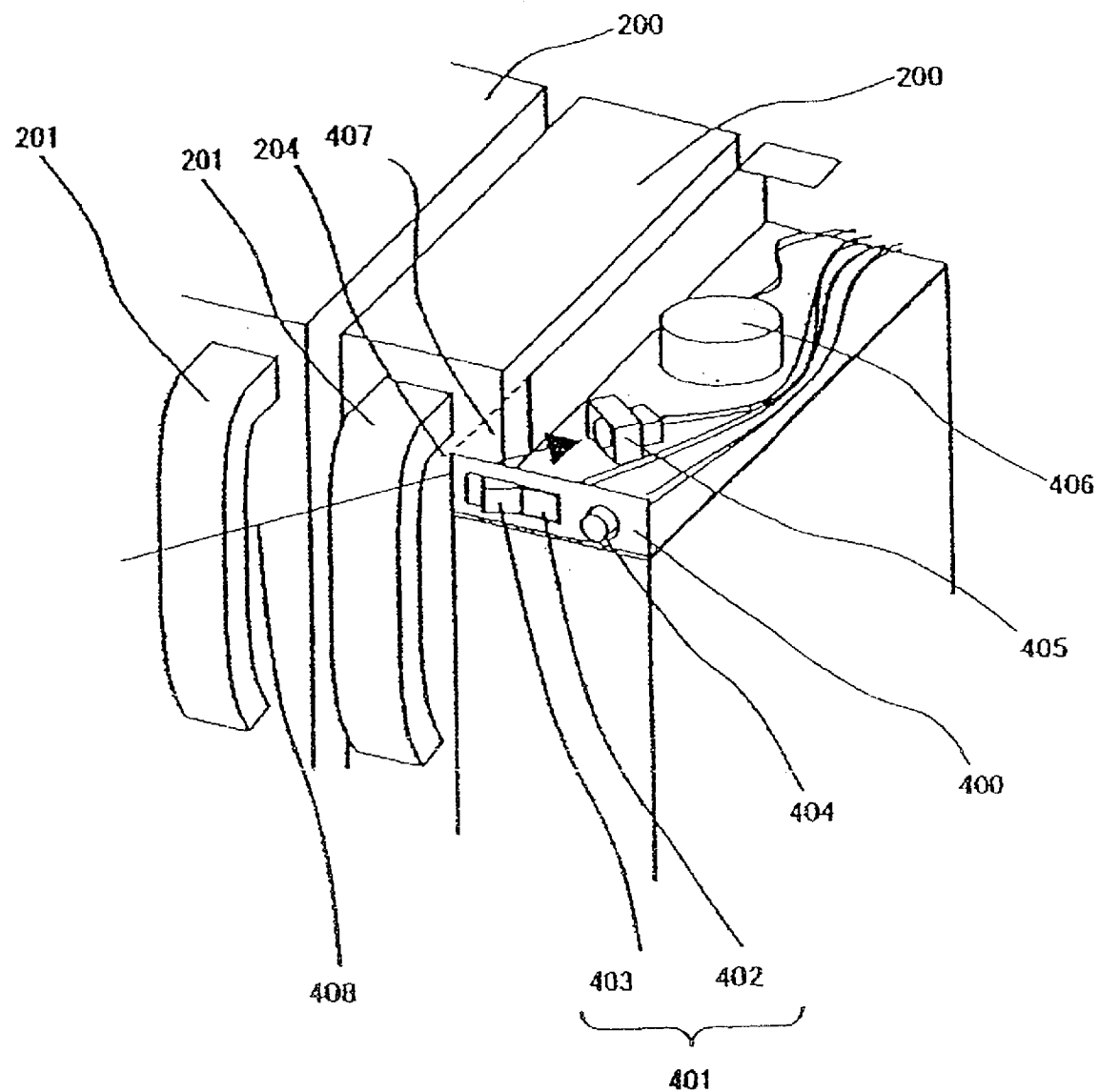
FIG. 3 is an external perspective view of an operation module according to the embodiment taken from the front right-hand side.

The operation module 400 will now be described with reference to FIG. 3. In order to realize disk array device downsizing, the operation module 400 is designed so as to minimize the volume that it occupies. The front of the operation module 400 carries only a power switch 401 and an alarm buzzer stop switch 404. A setting switch 405 is mounted inside the module together with an alarm buzzer 406. The power switch 401 functions as a power switch for the disk array device. When an error occurs in the disk array device, the alarm buzzer 406 sounds to alert the maintenance personnel to the encountered error. The alarm buzzer stop switch 404 is used to shut off the alarm buzzer 406. Pressing the alarm buzzer stop switch 404 silences the alarm buzzer. The setting switch 405 is used to set up the disk array device. For example, the setting switch 405 is used to toggle between remote control and local control modes. If, for instance, an external UPS (Uninterruptible Power Supply) is installed, the setting switch 405 is used to change the interlock control mode for the UPS.

Since the volume occupied by the operation module 400 is minimized, the power switch 401 and alarm buzzer stop switch 404 mounted on the front of the operation module 400 are positioned close to each other. Therefore, when the alarm buzzer stop switch 404 is pressed to silence the alarm buzzer in an emergency such as when an error alarm is given, there is a possibility that the power switch 401 may be inadvertently touched. As such being the case, the power switch 401 is arranged so that, when the side 402 of the power switch 401 closer to the alarm buzzer stop switch 404 is pressed, the disk array device is turned ON and that, when the side 403 of the power switch 401 far from the alarm buzzer stop switch 404 is pressed, the disk array device is turned OFF. Such a configuration prevents the disk array device from being shut down unexpectedly due to an operating error. It should be noted that, even if the alarm buzzer stop switch 404 is inadvertently pressed when pressing the power-ON side 402 of the power switch 401, no particular problem arises.

The setting switch 405 is provided inside the operation module 400. The reason to this is that remote/local control mode switching and other disk array device setup operations are less frequently performed than the use of the power switch 401 and alarm buzzer stop switch 404. However, low user-friendliness results if, for instance, the disk array chassis has to be disassembled for the purpose of adjusting the internal setting switch 405. Therefore, an opening 407 is provided in a lateral part of the operation module 400 so that the setting switch 405 can easily be adjusted without having to disassemble the disk array device chassis. The setting switch 405 can be accessed for adjustment purposes by inserting a tool into the opening 407 in the direction of the arrow 408 while making use of a space 204 that is provided near the HDD module detachment handle 201 of a HDD module 200 next to the operation module 400. As a result, operational ease can be provided while minimizing the volume occupied by the operation module.

It should be understood that the configurations described above are presented by way of example only. For instance, the height of the disk array device is not limited to 3 U. Further, a total of fifteen HDD modules 200 can be mounted by installing one additional HDD module 200 in the chassis's front rightmost position in which the battery module 500 and operation module 400 are mounted. This alternative configuration can be achieved because the combination of the battery module 500 and operation module 400 is configured to be equal to the HDD modules 200 in width and height. If this alternative configuration is used, the battery module 500 and operation module 400 will be installed in another position of the chassis 100. For an additionally installed disk array device, which does not require its own battery module 500 and operation module 400, fifteen HDD modules 200 are arrayed at the front of the chassis. By configuring the combination of the battery module 500 and operation module 400 to be equal to the HDD modules 200 in width and height as described above, the same basic structure can be applied to both an initial disk array device chassis and additional disk array device chassis. This results in reducing the design cost and manufacturing cost.

Figure 4:
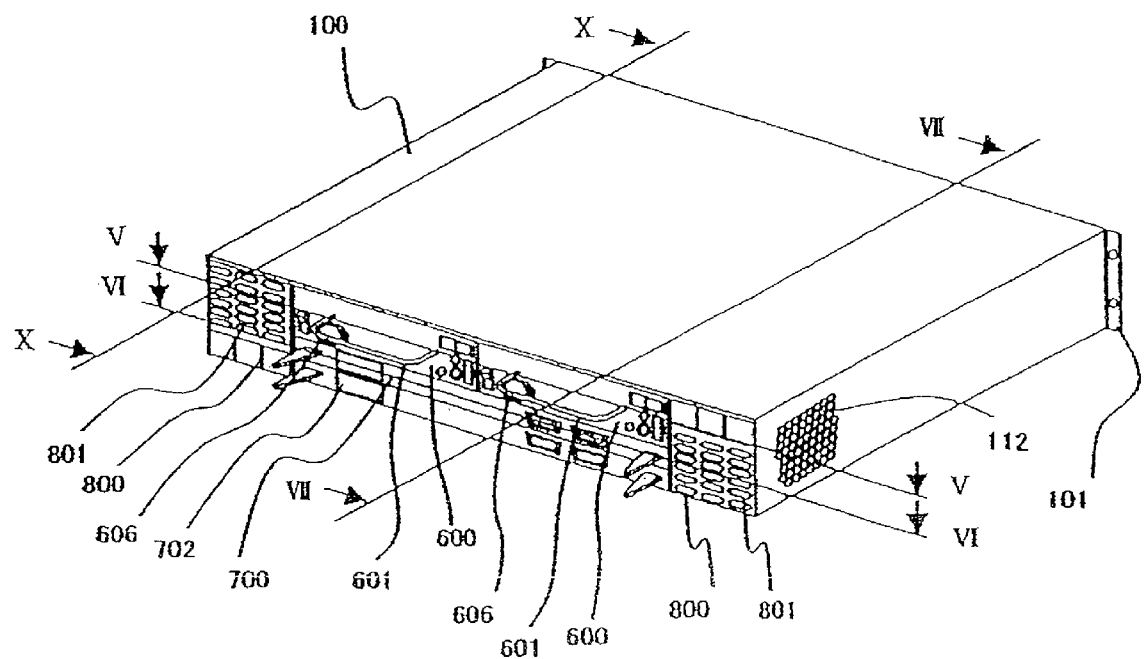
FIG. 4 is an external perspective view of a disk array device according to the embodiment taken from the rear left-hand side.

FIG. 4 is an external perspective view of a disk array device according to the present embodiment taken from the rear left-hand side.

The rear surface of the chassis 100 is open. Fan modules 800 are mounted on both the right-and left-hand sides of the chassis 100 in such a manner that the fan modules 800 are removable. Two modules 600 of power supply (hereinafter referred to as the power supply modules 600) are provided between the right-and left-hand fan modules 800. Two modules 700, 702 of controllers (hereinafter referred to as the controller modules 700, 702) are vertically arranged below the power supply modules 600. The power supply modules 600 and controller modules 700 and 702 can all be removed separately. It should be noted that the disk array device is operable even when it is provided with only one unit each of the fan module 800, power supply module 600, and controller module 700 (702) instead of two units each.

The fan modules 800 are provided to cool the interior of the chassis 100. Although the fan modules 800 are described in detail later, they have three internal fans 802, 803, 804, which take in warmed air within the chassis 100 and discharge it outside to cool the interior of the chassis 100. Air is discharged through air outlet slits 801 provided in the rear of each of the right-and left-hand fan modules 800 and through vent holes 112 provided in both sides of the chassis 100.

The power supply modules 600 supply electrical power to the entire disk array device. An AC input connector section 606 is mounted on the rear of each power supply module 600 to input AC power. The input AC power is converted to DC power by an AC/DC converter circuit on a power supply circuit board in each module and then supplied to the entire disk array device. A detachment handle 601 is mounted on the rear of each power supply module 600 for module insertion/removal. The power supply modules 600 are not provided with a fan. Although a fan is mounted on the rear of a conventional disk array device to cool the power supply module, the disk array device according to the present embodiment cools the power supply modules 600 using only the fan modules 800, which are mounted on both sides of the chassis 100. To enhance the efficiency of cooling provided by the fan modules 800, the rear surface of each power supply module 600 is covered to admit no outside air.

As a result, warmed air inside the power supply modules 600 is efficiently taken in by the fan modules 800. Further, waned air expelled by the fan modules 800 is blocked from returning to the interior of the chassis 100, thereby preventing circulation of warmed air. Furthermore, the front-to-rear dimension of each power supply module 600 is reduced because no fan is mounted on the rear of the module 600.

Controller modules 700 and 702 provide control of the disk array device, and incorporate a control circuit board, which carries a CPU (Central Processing Unit), memory, cache, and other components. Controller modules 700 and 702 are configured so as to share their caches. This results in an increase in the available cache capacity, thereby increasing the speed of data access from a host computer.

In order to share caches, however, the speed of data transfer between the controller modules 700 and 702 needs to be in the order of a CPU clock speed. To achieve such a high data transfer speed, it is necessary to minimize the influence of wiring capacitance and inductance as well as the influence of mutual interference (crosstalk) between adjacent wires. To accomplish this, it is necessary to minimize the wiring length. Although details will be given later, the disk array device according to the present embodiment minimizes the wiring length by positioning the two controller modules 700, 702 adjacent to each other in the direction of the height of the chassis 100 to maximizing the opposing areas of the controller modules.

In conventional devices, an enclosure is provided independently of a controller module; however, in the disk array device according to the present embodiment, an enclosure is incorporated as an integral component. The enclosure is a device that has means for managing additional installation of a disk array device. More specifically, the enclosure has a management function that provides integrated access control for each of the HDD modules 200 mounted in a plurality of disk array devices, in case a disk array device is additionally installed. It is possible to reduce the disk array device size by furnishing the controller modules 700 and 702 with an enclosure function and decreasing the number of modules.

The rear of controller modules 700 and 702 is provided with an interface for communicating with an external device. As is the case with the power supply modules 600, the rear of controller modules 700 and 702 is not provided with vent holes. Therefore, the cooling air provided by the fan modules 800 smoothly flows within controller modules 700 and 702 and is then discharged. No wed air flows inward from the outside.

The internal parts arrangement of the disk array device will no be described with reference to FIGS. 5 to 10.

Figure 5:
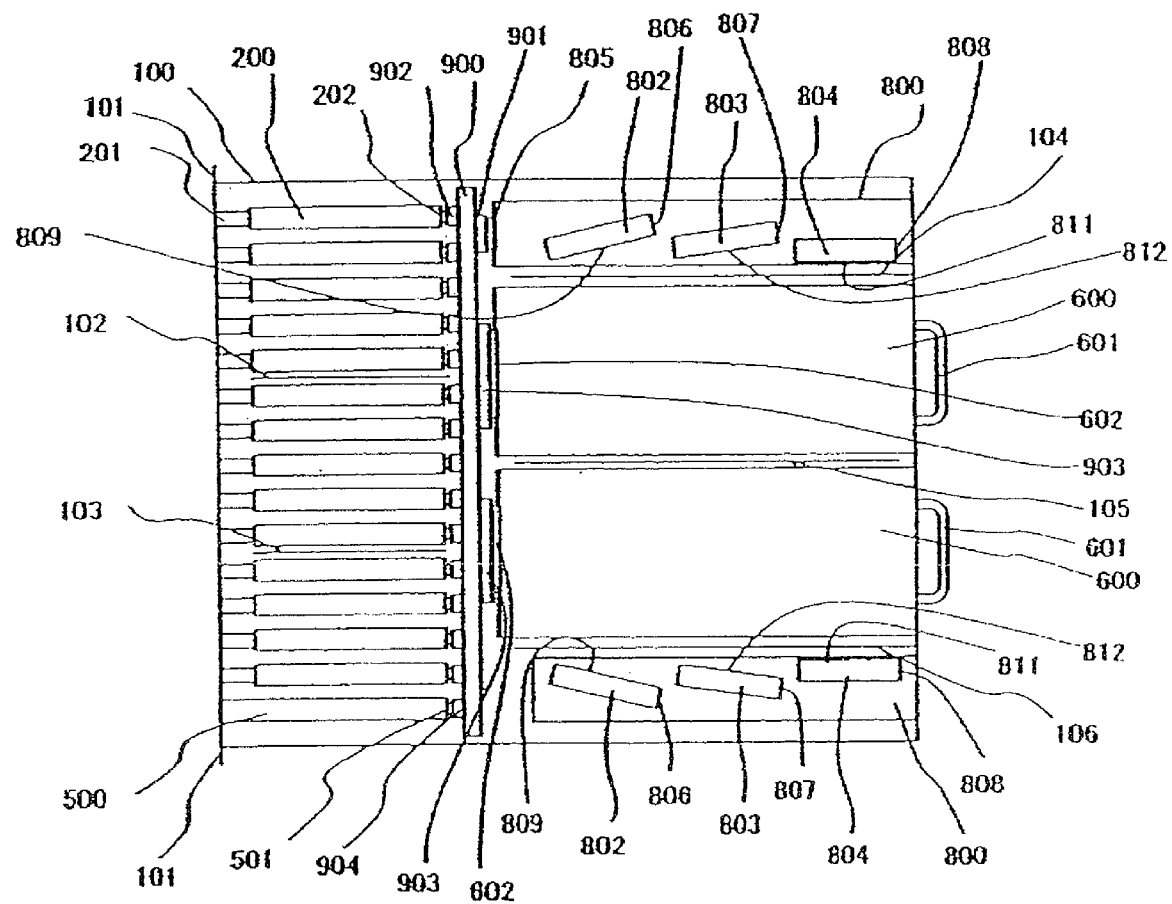
FIG. 5 is a schematic cross-sectional view taken along line V-V of a disk array device according to the embodiment.

FIG. 5 is a schematic cross-sectional top view, which illustrates cross-section taken along line V-V of the disk array device shown in FIG. 4. The HDD modules 200 and battery module 500 are mounted in the front opening in the chassis 100. The fan modules 800 and power supply modules 600 are mounted in the rear opening of the chassis 100. The modules in the front opening and the modules in the rear opening are all connected to a circuit board 900.

The HDD modules 200 are slidably mounted in the front of the chassis 100 so that they can be exchanged easily. Each CD module 200 is equipped with a detachment handle 201 so that the module 200 can easily be removed from and reinserted into the chassis 100. The rear of each HDD module 200 is equipped with a connector 202, which is connected to a HDD module connector 902 provided on the circuit board 900. By connecting these connectors 202 and 902, data is read/write from/to a HDD module 200. In order to ensure the strength of the chassis 100, the compartment for the HDD modules 200 is provided with two partitioning plates 102, 103.

As is the case with the HDD modules 200, the battery module 500 is slidably mounted in the front of the chassis so that it can be exchanged easily. The battery module 500 is not equipped with a detachment handle because it is less frequently removed and reinserted than the HDD modules 200; however, it is needles to say that the battery module 500 can be equipped with such a detachment handle. The battery module 500 is equipped with a connector 501, which is connected to a battery module connector 904 provided on the circuit board 900. By connecting these connectors 501 and 904, the electrical power stored in the battery module 500 can be supplied to the disk array device in the event of a power failure.

The power supply modules 600 are mounted in such a manner that they can be removed and reinserted from the rear of the chassis 100. Two power supply modules 600 can be mounted adjacent to each other. Since the power supply modules 600 are relatively heavy, each of them is equipped with a handle 601 for ease of removal/insertion. Each power supply module 600 is equipped with a connector 602, which is connected to a power supply module connector 903 provided on the circuit board 900. By connecting these connectors 602 and 903, electrical power is supplied to the modules in the disk array device.

The fan modules 800 are mounted on both sides of the chassis 100 in such a manner that they can be removed and reinserted. Each fan module 800 is equipped with a connector 805, which is connected to a fan module connector 901 on the circuit board 900. By connecting these connectors 805 and 901, a fan control signal and electrical power are received. Each fan module 800 incorporates three fans 802, 803, 804. These fans take in air from intake surfaces 809, 807, and 808, which face the power supply module, and discharge air from air outlets 806, 807, and 808, which face the rear of the chassis 100. If the flaws of air discharged by the fans 802, 803, 804 interfere with each other, the air-discharge efficiency lowers due to air flow disturbance. To avoid such a problem, the fans 802, 803, 804 are arranged in such a manner so that the air outlets 806, 807, 808 face towards different directions.

Partitioning plates 104, 106 are positioned between the fan modules 800 and power supply modules 600. Another partitioning plate 105 is also positioned between the two power supply modules 600. As described later, these partitioning plates have vent holes so that the cooling air provided by the fan modules 800 efficiently flows within the chassis 100.

Figure 6:
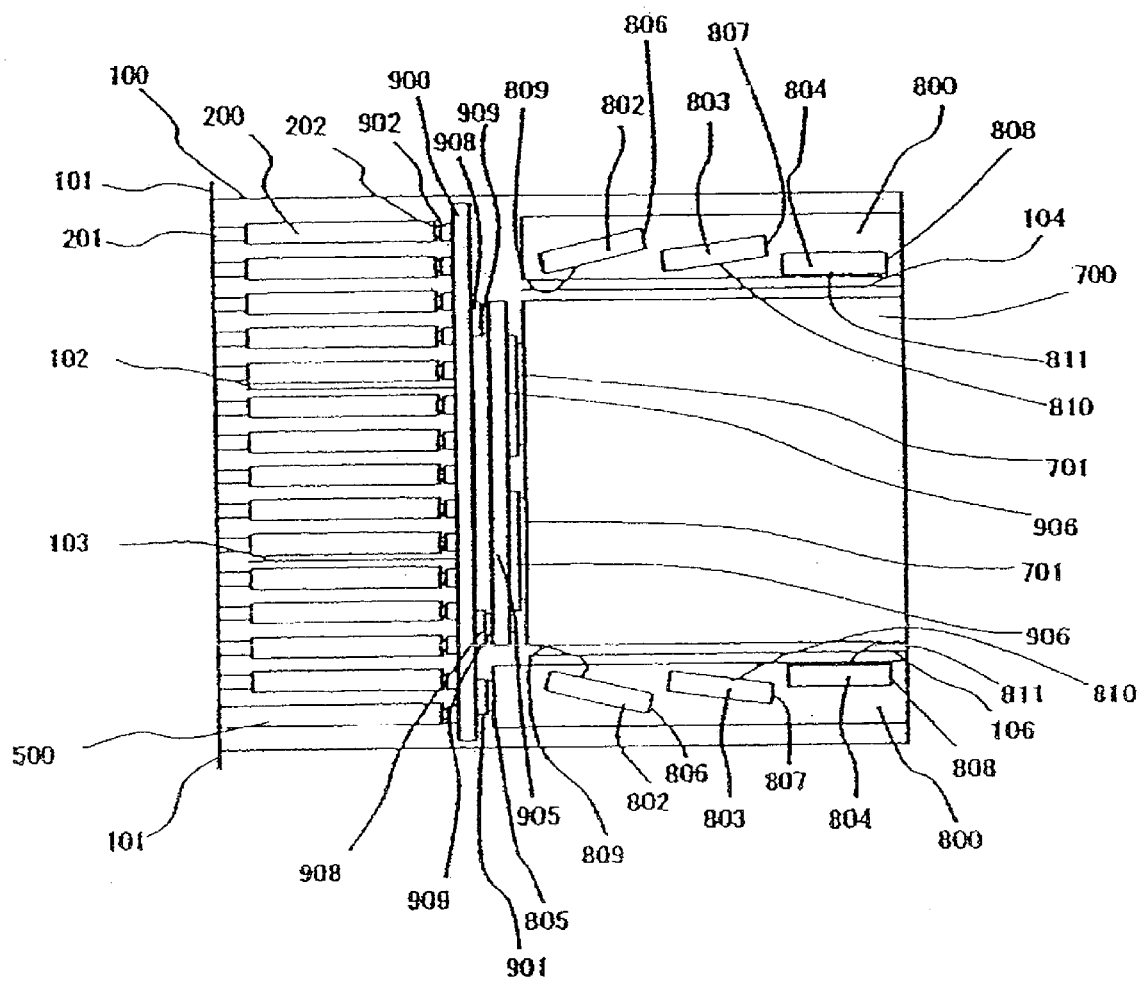
FIG. 6 is a schematic cross-sectional view taken along line VI-VI of a disk array device according to the embodiment.

FIG. 6 is a schematic cross-sectional top view, which illustrates cross-section taken along line VI-VI of the disk array device shown in FIG. 4. The HDD modules 200 and battery module 500 are mounted in the front opening in the chassis 100. The fan modules 800 and controller module 700 are mounted in the rear opening of the chassis 100.

Behind the aforementioned circuit board 900, another circuit board 905 is provided for connecting to the controller module 700. The circuit board 900 in the front of the chassis and the circuit board 905 connected to controller module 700 are hereinafter referred to as the front circuit board 900 and rear circuit board 905, respectively. The rear circuit board 905 is equipped with connectors 906, each of which being connected to connectors 701 provided on the controller module 700. The front circuit board 900 and rear circuit board 905 are interconnected via connectors 908 and 909. Although details are given later, the height of the chassis is reduced thanks to the use of the two circuit boards. The clearance between the front circuit board 900 and rear circuit board 905 is set to an optimum value. An excessive clearance would increase the front-to-rear dimension of the chassis 100; if, on the contrary, the clearance is too small, the pins of the HDD module connectors 902, which penetrate through the front circuit board 900, may come into contact with the pins of the controller module connectors 906, which penetrate through the rear circuit board 905. Therefore, the clearance between the front circuit board 900 and rear circuit board 905 set to an optimum value, while keeping the sizes of connectors 908 and 909 in mind.

The controller module 700 is mounted in such a manner that it can be removed from and reinserted into the rear of the chassis 100. The controller module 700 incorporates a control circuit board, which carries a CPU, memory, cache, and other components, and has an enclosure function (that is, has a management portion for managing additional installation) for managing additional disk array device installations. The management portion for managing additional installation may be realized by, for example, a memory or the like in the controller module 700 that stores an appropriate program, and a CPU in the controller module 700 that can execute the program. The controller module 700 is connected to the various modules in the disk array device via the rear circuit board 905, and controls and manages the various modules.

Partitioning plates 104, 106 with vent holes are provided between the controller module 700 and the fan modules 800. These partitioning plates are the same as the partitioning plates provided between the power supply modules 600 and the fan modules 800.

Figure 7:
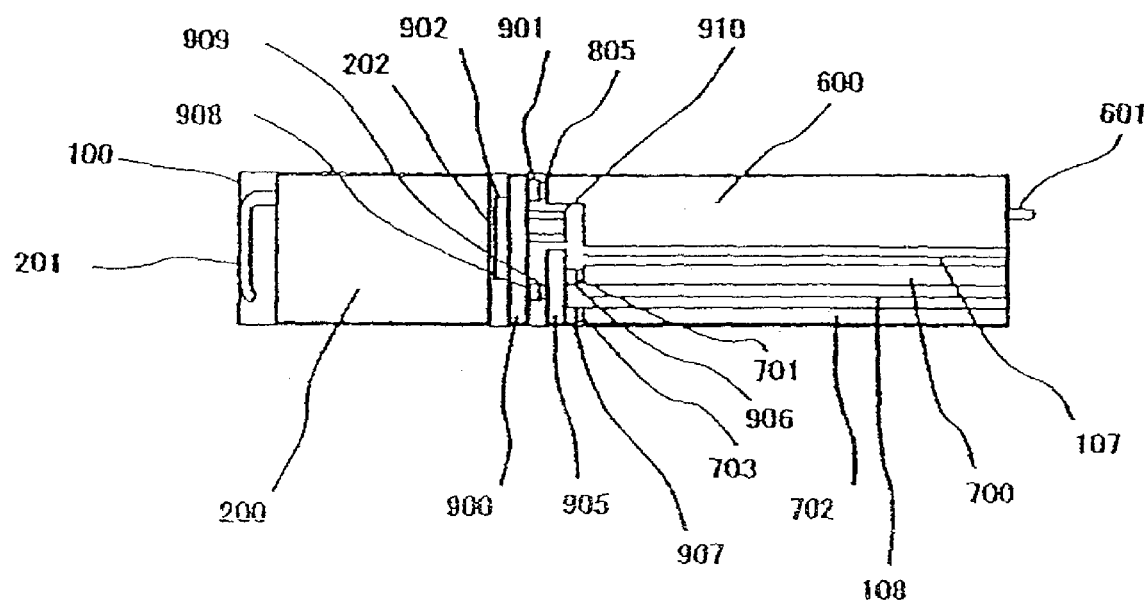
FIG. 7 is a schematic cross-sectional view taken along line VII-VII of a disk array device according to the embodiment.
Figure 8:
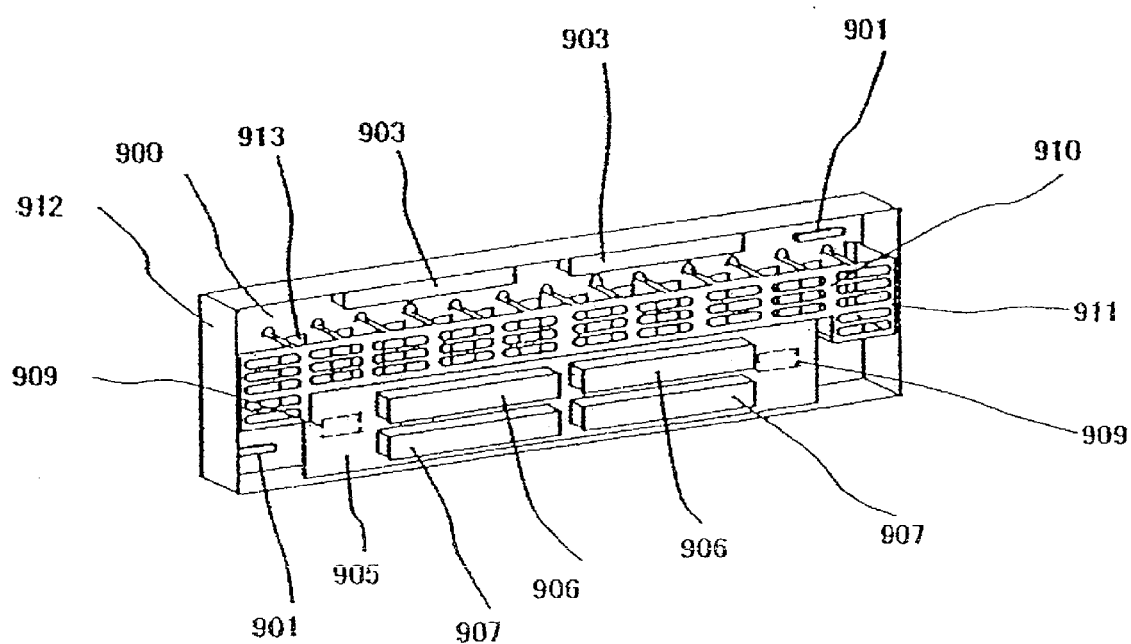
FIG. 8 is an external perspective view of a circuit board according to the embodiment taken from the rear right-hand side.

FIG. 7 is a schematic cross-sectional right-side view, which illustrates cross-section taken along line VII-VII of the disk array device shown in FIG. 4. The HDD modules 200 are mounted in the front opening in the chassis and connected to the front circuit board 900. The rear opening in the chassis houses the power supply modules 600, which are mounted in the upper section, and the controller modules 700 and 702, which are mounted in the lower section. The power supply modules 600 are connected to the front circuit board 900. The controller modules 700 and 702 are connected to the rear circuit board 905.

A partitioning plate 107 is provided between the power supply modules 600 and the controller module 700. The partitioning plate 107 is joined with partitioning plates 104, 105, and 106 to support the power supply modules 600 from below. A partitioning plate 108 is provided between the controller modules 700 and 702. The partitioning plate 108 is joined with partitioning plates 104 and 106 to support the controller module 700 from below. No vent holes are provided in the partitioning plates 107 and 108. This prevents the cooling air flow within the chassis from fluctuating in the vertical direction and restricts disturbance of the cooling air.

The front circuit board 900 is provided with a rectification plate 910, which is installed above the rear circuit board 905. The rectification plate 910 not only reinforces the front circuit board 900 but also rectifies the cooling air flow within the chassis 100. The circuit board structure will now be described with reference to FIG. 8.

The front circuit board 900 and the rear circuit board 905 are interconnected with connectors 908 and 909. Information exchange between the front circuit board 900 and the rear circuit board 905 takes place via the connectors 908 and 909. The connectors 908 and 909 are positioned between the front circuit board 900 and rear circuit board 905. From the illustrated viewing angle, the pins of connector 909 penetrating through the rear circuit board 905 are visible.

The front and rear circuit boards 900 and 905 are secured to a circuit board retention frame to construct a circuit board assembly 912. The rear circuit board 905 has connectors 906 and 907, which connect to the two controller modules 700, 702. The connectors 906 are for connecting to the controller module 700, whereas the connectors 907 are for connecting to the controller module 702. As described above, since the controller modules 700 and 702 share their cache data, they need to transfer the data at a high speed between them. According to the configuration of the controller modules of the present embodiment, the connectors 906 and 907 are provided on the rear circuit board 905 in such a manner that the corresponding pins of the connectors 906 and 907, which are located next to each other in the vertical direction, are arranged in the same position in each connector. Therefore, the length of the wiring on the rear circuit board 905 for pin connection can be minimized. This feature provides high-speed data transfer between the controller modules 700 and 702, thereby letting them share their cached data.

Further, by dividing the circuit board into the front circuit board 900 and rear circuit board 905 and providing the connectors 906 and 907 on the rear circuit board 905, it is possible to reduce the height of the circuit board assembly 912. The reason is that, if an attempt is made to mount connectors 906 and 907 on the rear of the front circuit board 900, they need to be mounted on the upper or lower part of the circuit board in order to avoid interference with the pins of the HDD module connectors 902 mounted on the front side.

Connectors 903 for connecting to the two power supply modules 600 and connectors 901 for connecting to the two fan modules 800 are mounted on the front circuit board 900. These connectors are positioned so that they do not interfere with the pins of the HDD module connectors 902. The same fan modules 800 are used for the module 800 mounted on the right-hand side of the chassis and for the module 800 mounted on the left-hand side. Therefore, the right-and left-hand side connectors 901, which are both mounted on the front circuit board 900 to connect to the fan modules 800, are placed at opposite positions in the vertical direction.

The front circuit board 900 also carries a rectification plate 910, which rectifies the cooling air flow within the chassis 100. The rectification plate 910 has a plurality of slits 911, the longitudinal direction of which being arranged in a direction parallel to controller modules 700 and 702. Since the air flow that passes by the HDD modules 200, which are mounted at the front of the chassis 100, comes through gaps between adjacent ones of the HDD modules 200, the flow is like a vertically-spread wind. This air flow passes through holes 913 in the front circuit board 900 and flows toward the rear of the chassis 100. The size of the holes 913 in the circuit board 900 is made as large as possible. However, due to the limitations imposed by the wiring patterns provided on the circuit board, the holes 913 are not shaped to optimally restrict disturbance in the vertically spread air flow coming out of gaps between the HDD modules 200. Therefore, the air flow becomes disturbed when it passes through holes 913 in the circuit board. Further, the power supply modules 600 and the controller modules 700 and 702, which are mounted in the rear of the chassis 100, have internal electronic circuit boards. These electronic circuit boards are arranged so that their surfaces are oriented in a lateral direction within the chassis 100. In order to make the air flow smoothly in the rear part of the chassis 100, it is necessary to rectify the air flow so that it spreads in the lateral direction. The rectification plate 910 is mounted on the front circuit board 900 for such air flow smoothing. The rectification plate 910 has a plurality of slits 911, the longitudinal direction of which being arranged in a direction parallel to controller modules 700 and 702. The air flow is rectified and spreads in the lateral direction after passing through the slits 911 in the rectification plate 910. As a result, the disturbance in the air flow that flows by the controller modules 700 and 702 and the power supply modules 600 is restricted to efficiently cool the interior of the chassis 100.

Further, the use of the rectification plate 910 increases the strength of the circuit board 900. Inserting the connector 202 of a HDD module 200 applies great force to the front circuit board 900. Therefore, if the front circuit board 900 is not strong enough, it may gradually deform when the connector is inserted many times over the years. Since the rectification plate 910 is added to increase the circuit board strength, the number of other reinforcement members can be reduced. As a result, it became possible to reduce the circuit board size.

Figure 9:
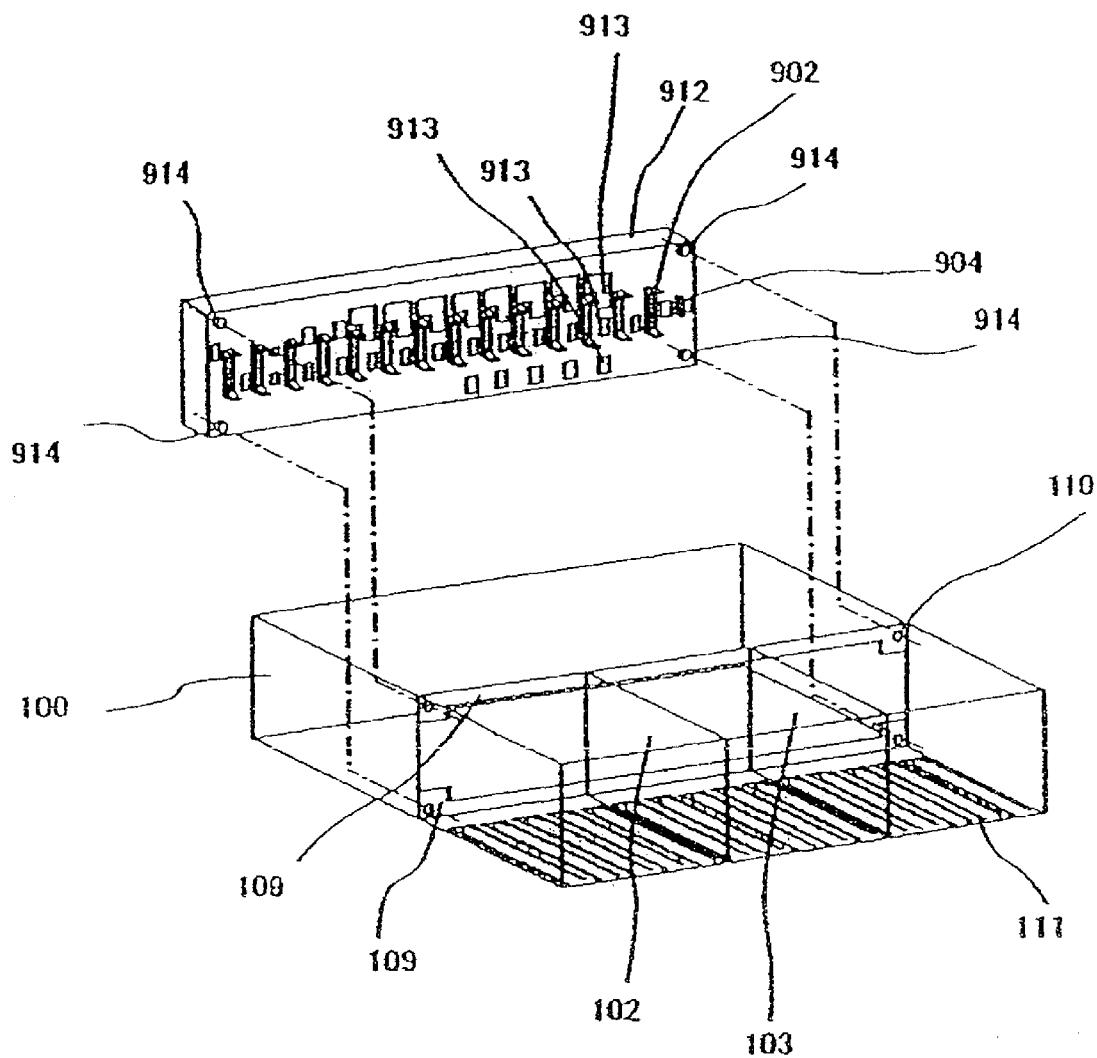
FIG. 9 illustrates how a circuit board provided with high-precision positioning means according to the embodiment is mounted on a chassis.

The way of mounting the circuit board into the chassis will now be described with reference to FIG. 9, which is an external perspective view taken from the rear left-hand side of the circuit board.

It is important to position the circuit board in the chassis at high precision. If the positioning accuracy for such mounting is inadequate, the HDD modules 200 cannot be connected because the connectors 202 of the HDL modules 200 will be misaligned with the connectors 902 on the connector circuit board. For an array of up to fourteen HDD modules 200 and the battery module 500, all their connectors need to be in precise alignment.

As described above, the HDD module connectors need to be precisely aligned with the mating connectors on the circuit board. That is why the circuit board could not be mounted directly in the chassis conventionally. In conventional devices, a dedicated front chassis was employed to house HDD modules. After arrangement of the connectors in the front chassis with high accuracy, the front chassis was fastened to a chassis main body. Due to the use of a dual chassis structure, in which the chassis main body incorporates another chassis (front chassis) for housing HDD modules, the disk array device could not be downsized.

The disk array device according to the present embodiment employs the following configuration for mounting the circuit board in the chassis main body with high accuracy. Nuts (protrusions) 914 are fastened to the four corners of the front of the circuit board for use in mounting the circuit board in the chassis 100. Backboard retention plates 109 are fastened to the upper and lower sides of the chassis 100 in order to assemble the circuit board assembly 912. The circuit board retention plates 109 have holes 110 that have substantially the same diameter as the nuts 914 and that are positioned corresponding to the nuts 914, which are fastened to the four corners of the front of the circuit board. When the circuit board assembly 912 is to be mounted into the chassis 100, the nuts 914, which are fastened to the four corners of the front of the circuit board, are fitted into the circuit board mounting holes 110 and then bolted down from the front of the chassis 100. Consequently, the circuit board assembly 912 can be easily mounted in the chassis 100 with high accuracy and without having to provide a dedicated front chassis for housing the HDD modules. As a result, it became possible to realize downsizing of the disk array device.

In addition, the front circuit board 900 is provided with a plurality of holes 913 for venting cooling air. The vent holes 913 in the circuit board 900 are made to be as large as possible.

Figure 10:
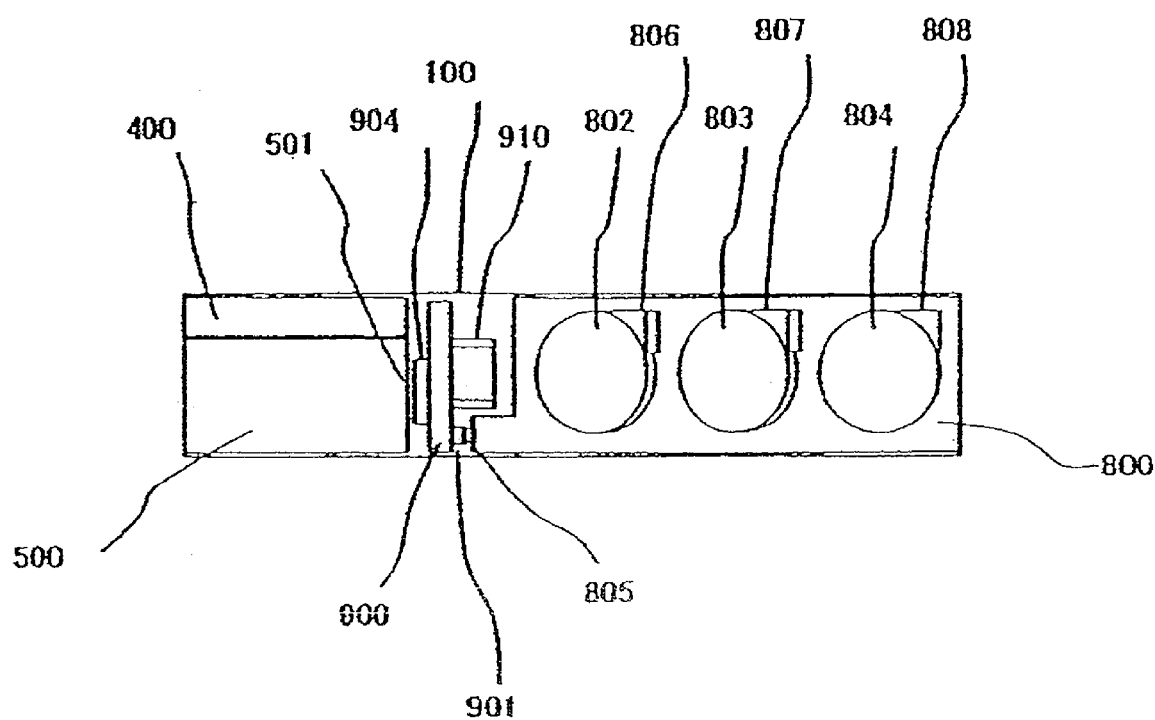
FIG. 10 is a schematic cross-sectional view taken along line X-X of a disk array device according to the embodiment.

FIG. 10 is a schematic cross-sectional right-side view, which illustrates cross-section taken along line X-X of the disk array device shown in FIG. 4. The battery module 500 and the operation module 400 are mounted in the front opening in the chassis 100 and connected to the front circuit board 900. The fan modules 800 are mounted in the rear opening in the chassis 100 and connected to the front circuit board 900. The front circuit board 900 is provided with the rectification plate 910.

Each fan module 800 contains three fans 802, 803, 804. The air outlets 806, 807, 808 of the fans are oriented toward the chassis in such a manner that their discharged air flows do not interfere with each other.

Figure 11:
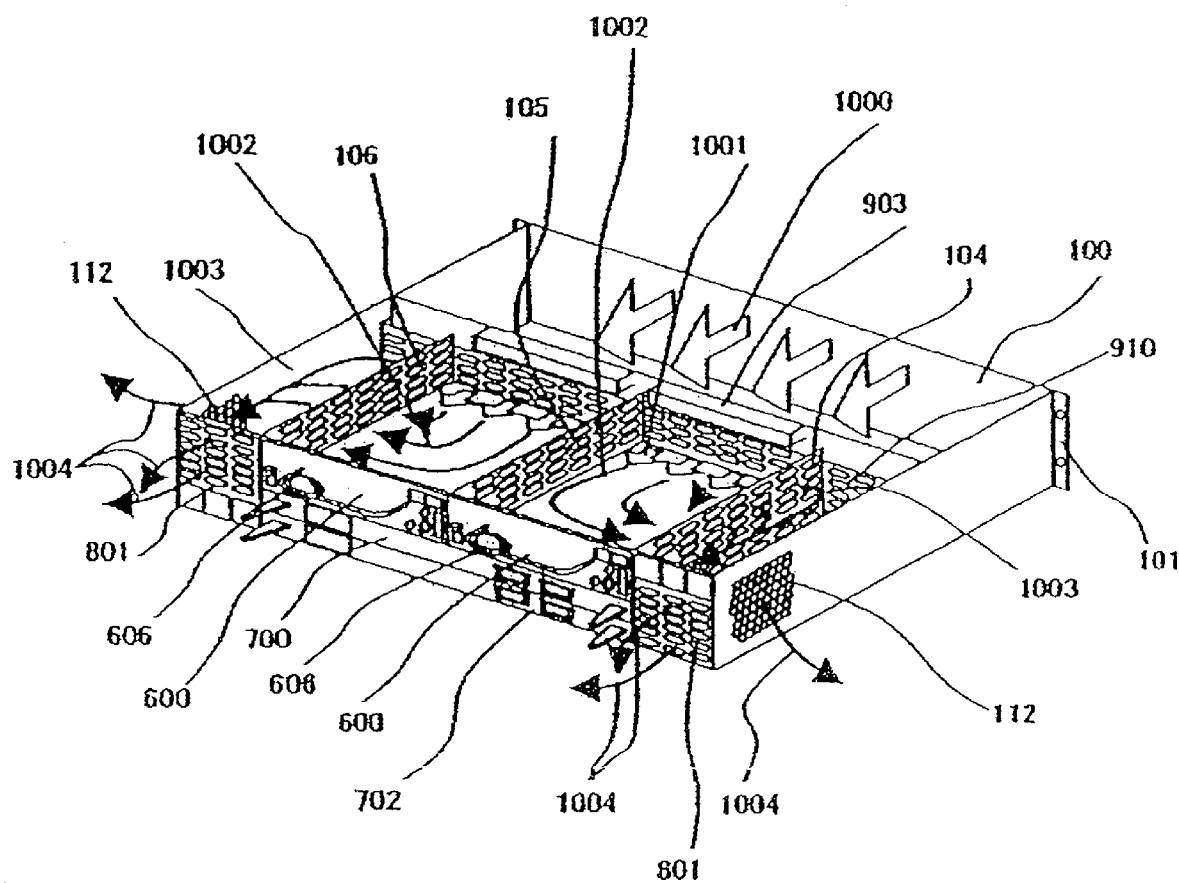
FIG. 11 illustrates how cooling air flows within a disk array device according to the embodiment.

The cooling air flow within the chassis 100 will now be described with reference to FIG. 11.

Figure 13:
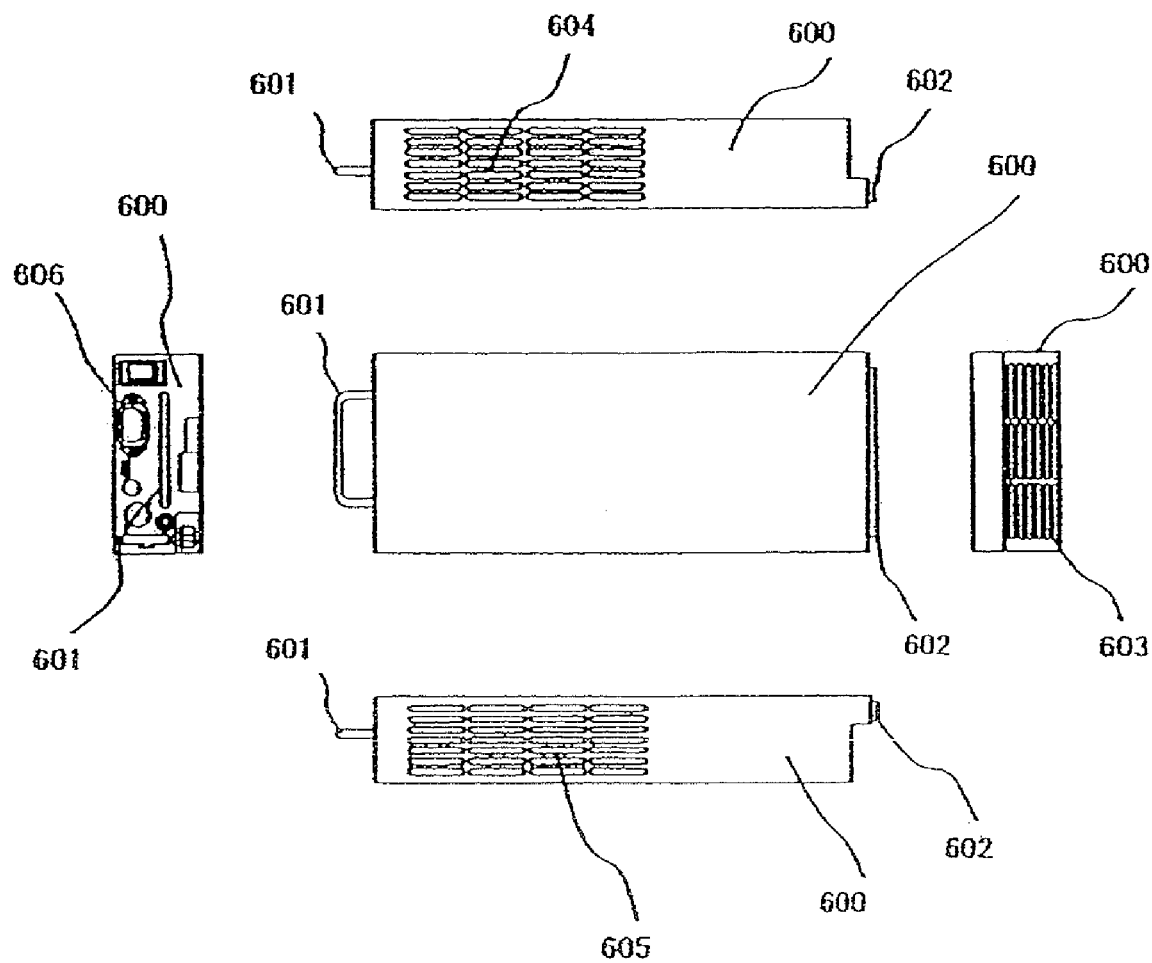
FIG. 13 is a projection of a power supply module according to one embodiment.

When the fans 802, 803, 804 in the fan modules 800 operate, the outside air is taken in from the front of the chassis and is caused to flow in the section of the HDD modules 200. The cooling air flow 1000 in the section of the HDD modules 200 flows through the gaps between adjacent ones of the HDD modules 200. Therefore, the cooling air spreads in a vertical direction and flows toward the rear of the chassis. This cooling air flow 1000 is rectified by the rectification plate 910 provided on the circuit board. The rectified cooling air flow 1001, which now spreads in a horizontal direction, is taken into the power supply modules 600 and the controller modules 700 and 702. FIG. 13 is a projection of a power supply module 600. As shown in FIG. 13, elongated holes 603 that extend in the lateral direction are provided in the front of the case of the power supply modules 600. These holes 603 are made so that their positions and shapes agree with those of the holes in the rectification plate 910. Therefore, the air flow 1001, which is rectified by the rectification plate 910, smoothly enters the power supply modules 600. As in FIG. 11, the air flow 1002, which is introduced into the power supply modules 600 and controller modules 700 and 702, passes through the partitioning plates 104, 106, and is taken into the right-and left-hand fan modules 800. The air flow 1003, which is introduced into the fan modules 800, is discharged out of the air outlets 801 in the rear of the fan modules 800 and out of the vent holes 112 in both sides of the chassis 100 (1004). The positions and shapes of the laterally elongated holes in the partitioning plates 104, 106 agree with those of the holes 604, 605 in both sides of the power supply modules 600. Therefore, the cooling air flow can smoothly flow past the partitioning plates 104, 106. Further, no vent holes are provided in the rear of the power supply modules 600 or controller modules 700 and 702. This prevents the air flow 1004, which has been discharge from the fan modules 800, from going back into the chassis 100.

Figure 12:
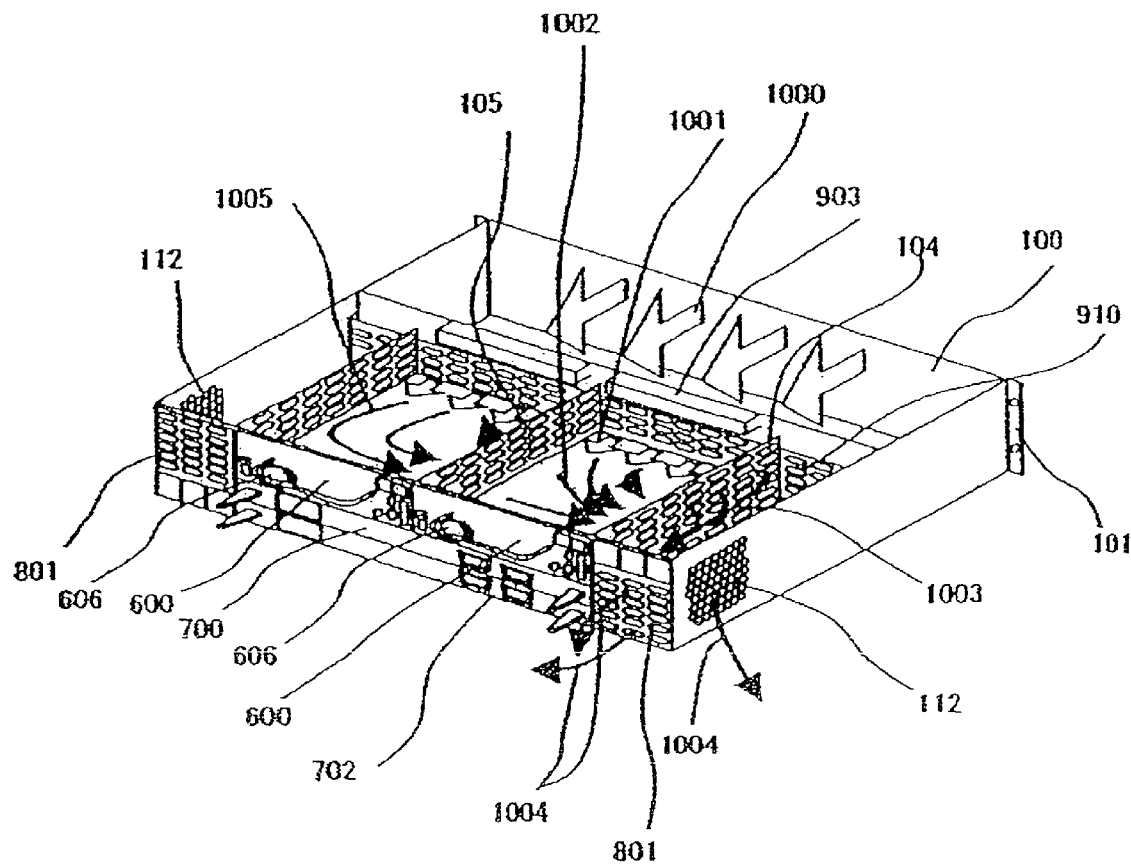
FIG. 12 illustrates how cooling air provided by a single fan flows within a disk array device according to the embodiment.

The process of cooling the whole interior of the chassis 100 when one fan module 800 is faulty will now be described with reference to FIG. 12. The following description applies not only to a case where one fan module 800 is faulty, but also to a case where only one fan module 800 is installed. An example is given where only the left-hand fan module is used to cool the interior of the chassis 100

The air flow coming from the section of the HDD modules 200 passes through the rectification plate 910 and moves towards the power supply modules 600 and the controller modules 700 and 702. The air flow 1002 introduced into the left-hand power supply module 600 is taken into the left-hand fan module 800. Further, the air flow 1005 introduced into the right-hand power supply module 600 is also taken into the left-hand fan module 800. The reason is that the partitioning plate 105 provided between the right-and left-hand power supply modules 600 is provided with laterally elongated holes, whose positions and shapes are identical with those of the holes 604, 605 in the lateral surfaces of the power supply modules 600. Further, since no vent holes are provided in the rear of the power supply modules 600, the suction force provided by the left-hand fan module 800 affects not only the air in the left-hand power supply module 600 but also the air in the right-hand power supply module 600. In this manner, the air in the right-and left-hand power supply modules 600 and the controller modules 700 and 702 is entirely taken into the left-hand fan module 800 and discharged outside. As a result, the interior of the chassis 100 can be cooled even when a fan module 800, which plays an important role of cooling the interior of the chassis 100, becomes faulty. Therefore, the operation of the disk array device can be continued. It should be noted that a failure in a fan module 800 is detected by controller module 700 or 702, and, for example, the alarm buzzer 406 in the operation module 400 is caused to sound. In this way, the failure is reported to the maintenance personnel.

While the present invention has been described in terms of the present embodiment, it should be understood that the invention is not limited to the present embodiment, and that variations may be made without departure from the scope and spirit of the invention.

Advantages provided by the present embodiment will now be described.

The circuit board is capable of being attached in the chassis parallel to the opened front surface; the hard disk drive module is connected to a front side of the circuit board from the opened front surface of the chassis, the one side of the hard disk drive module being aligned with the one side of the opened front surface of the chassis; the battery module is connected to the front side of the circuit board from the opened front surface of the chassis in a position adjacent the hard disk drive module; and the controller module, the power supply module, and the fan module are connected to a rear side of the circuit board from the opened rear surface of the chassis. Thanks to such a configuration, the hard disk drive module and the battery module can be inserted/removed into/from the front of the disk array device for module insertion/removal purposes. Therefore, maintenance and inspection of the disk array device can be made with ease. Further, by arranging the power supply module, the controller module, and the fan module at the rear, it becomes possible to prevent setting changes, such as cabling changes, from being made easily. These features increase the disk array device's serviceability, maintainability, and security.

The circuit board has a front circuit board to which at least the hard disk drive module and the battery module are connected to the front side thereof, and to which the power supply module and the fan module are connected to the rear side thereof, and a rear circuit board to which the controller module is connected; and the front circuit board and the rear circuit board are positioned adjacent and parallel to each other and connected together with an electrical connector. Accordingly, since the circuit board size can be reduced, the circuit board can be mounted within a chassis for a small-size disk array device.

The controller module has a management portion for managing additional installation of a disk array device. According to this configuration, it becomes possible to decrease the number of modules and reduce the disk array device size.

The controller module is substantially flat; a plurality of the controller modules are capable of being be arranged on the circuit board adjacent to each other in a direction of the height of the chassis to maximize the area in which the controller modules oppose each other; and the connectors for connecting each of the controller modules to the circuit board are arranged on the circuit board in the direction of the height of the chassis. Accordingly, the length of the wiring on the circuit board for connecting the controller modules can be minimized. This decreases the wiring space, thereby reducing the size of the circuit board. Further, since crosstalk between wires can be avoided, it becomes possible for the controller modules to share a cache.

The chassis has at least one hole and/or at least one protrusion; and the circuit board has at least one protrusion that fits into the hole of the chassis and/or at least one hole into which the protrusion of the chassis fits. Thanks to such a feature, since the circuit board can be directly attached to the chassis with high accuracy, it possible to reduce the size of the chassis.

Further, at least one of the fan modules is arranged near each side surface of the chassis. By cooling the interior of the chassis with fans provided near both side surfaces of the chassis, since it is unnecessary to furnish the power supply module with a fan, downsizing of the disk array device can be realized.

Each of the fan modules has a plurality of cooling fans; and air outlets of each of the cooling fans are oriented in directions different from each other to avoid interference between cooling air flow. Thanks to such a feature, since it is possible to discharge air from the cooling fans with high efficiency, it is possible to prevent the cooling air flow in the chassis from being disturbed.

The fan module is arranged near at least one side surface of the chassis; a partitioning plate is provided substantially in the middle of both side surfaces of the chassis; a set of the power supply modules is provided, and at least one of the power supply nodules is arranged on each side of the partitioning plate; the controller module is arranged across the partitioning plate; and the partitioning plate is provided with a vent hole. By adopting such a partitioning plate, it becomes possible to circulate cooling air within the chassis with only one fan module. Therefore, even if one of the fan modules becomes faulty, the whole chassis can be continuously cooled. As a result, the availability of the disk array device can be enhanced.

The controller module is substantially flat; and the circuit board has a plurality of holes extending in a direction parallel to the controller module. Thanks to such a configuration, the cooling air flow within the chassis can be rectified when it passes through the circuit board. As a result, the cooling air flow within the chassis is made to flow smoothly to efficiently cool the interior of the chassis.

Further, the length of the one side of the opened front surface of the chassis is between 128 mm and 129 mm when the diameter of the disk is 3.5 inches. Thanks to such a configuration, the height of the disk array device can be set to no more than 3 U (approximately 133.35 mm), which is defined by the ETA Standard EIA-310-D.

Further, the operation module includes an alarm buzzer stop switch, and a power switch for the disk array device, the power switch having an ON-side for turning the disk array device ON and an OFF-side for turning the disk array device OFF; and the alarm buzzer stop switch is arranged on the side of the ON-side of the power switch. Thanks to such a configuration, it becomes possible to prevent the disk array device from being turned OFF even if the power switch is inadvertently touched when the alarm buzzer stop switch is pressed to stop an alarm buzzer that sounds in the event of an error.

Further, a setting switch is provided inside the operation module; and the setting switch is capable of being manipulated for setup from a space in front of a hard disk drive module adjacent the operation module. Such a structure enables setting of the disk array device while keeping the volume occupied by the operation module as small as possible.

What is claimed is:

1. A disk array device comprising:
    a plurality of hard disk drive modules each having a disk drive for recording data;
    a controller module having a controller that controls writing/reading data into/from the disk drives;
    a power supply module that supplies power to the plurality of hard disk drive modules and the controller module;
    an operation module;
    a plurality of fan modules having respective fans that cool the plurality of hard disk drive modules, the controller module, and the power supply module; and
    a chassis housing the plurality of hard disk drive modules provided on a front side thereof, and the controller module, the power supply module, and the plurality of fan modules provided on a back side thereof, the controller module and the power supply module being placed between the plurality of fan modules,
    said operation module including an alarm buzzer stop switch and a power switch, said power switch having an ON-side whereby power is provided to said plurality of hard disk drive modules and an OFF-side whereby power is not provided to said plurality of hard disk drive modules, said alarm buzzer stop switch being disposed on said ON-side of said power switch, said operation module further including a setting switch that is accessible from a space in front of a hard disk drive module that is disposed adjacent to said operation module.

2. The disk array of claim 1 further comprising a partitioning plate and a second power supply module, wherein said partitioning plate is disposed between said power supply module and said second power supply module.

3. The disk array of claim 1 further comprising a partitioning plate disposed in a middle region of said chassis, wherein said controller module is arranged across said partitioning plate.

4. The disk array of claim 2 or 3 wherein the partitioning plate includes vent openings.

5. The disk array of claim 1 wherein a height of an opening of said front side of said chassis is substantially the same as a height of said hard disk drive modules.

6. The disk array of claim 1 wherein said chassis has a substantially rectilinear shape.

7. The disk array of claim 1 further comprising a circuit board, said hard disk drive modules being connected to a first side of said circuit board, said controller module and said power supply module being connected to a second side of said circuit board module.

8. The disk array of claim 7 wherein said hard disk drive modules are inserted into said chassis via an opening from said front side thereof, wherein said controller module and said power supply module are inserted into said chassis via an opening from said back side thereof.

9. The disk array of claim 7 further comprising a battery module inserted into said chassis via an opening from said front side thereof and connected to said circuit board.

10. The disk array of claim 1 further comprising a front circuit board, a rear circuit board disposed parallel and adjacent to said front circuit board, and an electrical connector connecting said front and rear circuit boards, said hard disk drive modules being connected to said first circuit board, said controller module and said power supply module being connected to said second circuit board module.

11. The disk array of claim 10 further comprising a battery module inserted into said chassis via an opening from said front side thereof and connected to said first circuit board.

12. The disk array of claim 1 wherein said controller module includes a management portion for managing additional installation of a disk array device.

13. The disk array of claim 1 further comprising additional controller modules vertically stacked atop each other and a circuit board having a column of connectors to which said vertically stacked additional controller modules are connected.

14. The disk array of claim 1 further comprising a circuit board to which said modules are connected, said chassis and said circuit board having a notch and a matching tab, wherein said notch mates with said matching tab thereby connecting together said chassis and said circuit board.

15. The disk array of claim 1 wherein at least one fan module is arranged on a first side of said chassis and another fan module is arranged on a second side of said chassis opposite said first side.

16. The disk array of claim 15 wherein cooling air flow provided by said fan modules is introduced from said front side of said chassis to cool at least said hard disk drive modules, said power supply module, and said controller module, and is discharged out of said back side of said chassis.

17. The disk array of claim 1 further comprising a circuit board to which said modules are connected, wherein said controller module is substantially flat and said circuit board includes a plurality of holes extending in a direction parallel to said controller module.

* * * * *